(12) United States Patent
Alexander et al.

(10) Patent No.: US 11,445,706 B2
(45) Date of Patent: Sep. 20, 2022

(54) PET LEASH CONTROL DEVICE

(71) Applicants: Dave Alexander, Mount Pleasant, SC (US); Bryan Goings, Fort Collins, CO (US)

(72) Inventors: Dave Alexander, Mount Pleasant, SC (US); Bryan Goings, Fort Collins, CO (US)

(*) Notice: Subject to any disclaimer, the term of this patent is extended or adjusted under 35 U.S.C. 154(b) by 123 days.

(21) Appl. No.: 16/990,734

(22) Filed: Aug. 11, 2020

(65) Prior Publication Data

US 2021/0045357 A1  Feb. 18, 2021

Related U.S. Application Data

(60) Provisional application No. 62/885,357, filed on Aug. 12, 2019.

(51) Int. Cl.
*A01K 27/00* (2006.01)

(52) U.S. Cl.
CPC .......... *A01K 27/004* (2013.01); *A01K 27/005* (2013.01)

(58) Field of Classification Search
CPC .... A01K 27/004; A01K 27/003; A01K 27/00; B65H 75/28; B65H 75/30; B65H 2701/35; B65H 75/4431
See application file for complete search history.

(56) References Cited

U.S. PATENT DOCUMENTS 92,573 A * 7/1869 Bradley ............. B65H 75/4431
242/385.4
3,224,706 A * 12/1965 Bastow ............. B65H 75/4431
242/378.1
(Continued)

FOREIGN PATENT DOCUMENTS

| GB | 788170 A | 12/1957 |
|---|---|---|
| JP | 4881285 B2 | 2/2012 |
| WO | WO 2012/042205 A1 | 5/2012 |

*Primary Examiner* — Kristen C Hayes
(74) *Attorney, Agent, or Firm* — Stellar Patent; Brian C Downing (57) ABSTRACT

A leash control device includes: a housing including a top cover and a bottom cover rigidly connected to the top cover; a cable wheel including a cylindrical outer ring, the cylindrical outer ring being configured for a leash cable to be wounded on an outer surface of the cylindrical outer ring; a button having a cylindrical member configured on an upper portion of the button and a base configured on a lower portion of the button, the cylindrical member being configured to be extended through a central hole of the top cover; and a compression spring configured to bias the button in an upward direction to cause the button to engage with the cable wheel; wherein: when a pressing force is applied to the cylindrical member of the button to counter an upward biasing force of the compression spring and no pulling force is applied to the leash cable, the button is configured to be pressed down and disengaged from the cable wheel, and after the button is disengaged from the cable wheel, the cable wheel is configured to rotate freely about a central axis when a pulling force is applied to the leash cable, causing the leash cable to unwind and extend out of the leash control device; and when the button is not pressed down and a pulling force is applied to the leash cable, a vertical post configured on an upper surface of the bottom cover interferes with an underside surface of the base of the button, preventing the button to be pressed down.

16 Claims, 4 Drawing Sheets

(56) References Cited

U.S. PATENT DOCUMENTS

| | | | |
|---|---|---|---|
| 3,318,288 A | 5/1967 | Mullritter | |
| 6,866,218 B2 * | 3/2005 | Liao | H02G 11/02 |
| | | | 242/378.1 |
| 6,997,410 B1 * | 2/2006 | Huang | B65H 75/4431 |
| | | | 242/385.4 |
| 7,455,255 B1 * | 11/2008 | Chao | H01R 13/72 |
| | | | 242/378.1 |
| 9,339,014 B1 | 5/2016 | Wettermann et al. | |
| 9,385,519 B2 * | 7/2016 | Deng | B65H 75/4431 |
| 2009/0039191 A1 * | 2/2009 | Yen | B65H 75/4431 |
| | | | 242/378.2 |

* cited by examiner

PET LEASH CONTROL DEVICE

CROSS-REFERENCE TO RELATED APPLICATION

This application claims the priority of U. S. Provisional Patent Application No. 62/885,357, filed on Aug. 12, 2019.

TECHNICAL FIELD

The present invention is generally related to tethers and leashes for holding, restraining and leading a domestic animal such as a dog, or other pet. More particularly, the invention is related to a miniature pet leash control device configured to make the leash retractable, extendable, and additionally functions as an accessory for the pet's collar, or can be used as a key holder.

BACKGROUND

Domestic animals such as dogs in particular require tethering when outside the confines of a residence. Taking one's pet dog for a walk is a common practice and a pleasurable hobby for pet owners. In the past, the tethers and leashes used to restrain a pet during such walks comprised of just a rope of a specific length, one end of which was tied to the animal's collar and the other end held by the dog walker. When walking a dog tied to the end of a rope, the walker's only means of restraining the dog is by tugging and pulling the rope which besides being tedious could also result in injury to the walker as well as to the dog.

The rope tethers of the past have given way to pet leashes that can be mechanically lengthened or shortened without the tugging and pulling involved with a single rope leash, making the of walking one's pet, a more pleasurable experience. Mechanical pet leashes currently in vogue are retractable type leashes wherein the length of the leash can be extended to allow a pet to roam freely when needed and retracted to control the pets free range motion.

A retractable leash available on the market may be configured with a housing and internal working mechanisms. However, the majority of such retractable leashes may have a bulky housing encumbering the dog walker with a cumbersome hold on the device. In addition, the switches and, or buttons to control the retraction and extension of the leash form a secondary protruding bulky part on the outside of the housings. Some retractable pulley-type leashes are not equipped with a braking mechanism to stop the leashes from extending and retracting to control the length of the leashes as needed when walking the pet. Although some retractable leashes may be equipped with braking systems, they may not include additional feature of a safety locking mechanism built into the leash control button to prevent the button being accidentally engaged. Therefore, it is desirable to have improved leash design.

SUMMARY

In one aspect of the present disclosure, a leash control device is provided. The leash control device includes: a housing including a top cover and a bottom cover rigidly connected to the top cover; a cable wheel including a cylindrical outer ring, the cylindrical outer ring being configured for a leash cable to be wounded on an outer surface of the cylindrical outer ring; a button having a cylindrical member configured on an upper portion of the button and a base configured on a lower portion of the button, the cylindrical member being configured to be extended through a central hole of the top cover; and a compression spring configured to bias the button in an upward direction to cause the button to engage with the cable wheel; wherein: when a pressing force is applied to the cylindrical member of the button to counter an upward biasing force of the compression spring and no pulling force is applied to the leash cable, the button is configured to be pressed down and disengaged from the cable wheel, and after the button is disengaged from the cable wheel, the cable wheel is configured to rotate freely about a central axis when a pulling force is applied to the leash cable, causing the leash cable to unwind and extend out of the leash control device; and when the button is not pressed down and a pulling force is applied to the leash cable, a vertical post configured on an upper surface of the bottom cover interferes with an underside surface of the base of the button, preventing the button to be pressed down.

According to certain embodiments of the leash control device, the base of the button has a non-circular cylindrical shape; the cable wheel further includes a second ring nested in the cylindrical outer ring, the second ring having a central hole having a non-circular shape that matches the base of the button; when the button is not pressed down, the base of the button fits into the central hole of the second ring of the cable wheel, engaging the cable wheel with the button, preventing the cable wheel to rotate freely, and preventing the leash cable to unwind when the pulling force is applied to the leash cable; and when the button is pressed down, the base of the button is not held within the central hole of the second ring of the cable wheel, allowing the cable wheel to rotate and the leash cable to unwind when the pulling force is applied to the leash cable.

According to certain embodiments of the leash control device, the base of the button has a hexagonal cylindrical shape and the central hole of the second ring has a hexagon shape that matches the base of the button.

According to certain embodiments of the leash control device, the button further includes a cavity configured on an underside of the base; the vertical post configured on the bottom cover has a non-circular shaped cross-section; the leash control device further includes a flat coil spring configured to bias the cable wheel with a tangential biasing force toward a first rotational direction relative to the top cover and the bottom cover when there is no pulling force applied to the leash cable; when the button and the cable wheel is engaged and there is no pulling force applied to the leash cable, the button is biased together with the cable wheel toward the first rotational direction and cause the cavity of the button to be aligned with the vertical post, allowing the vertical post to enter the cavity and allowing the button to be pressed down when the pressing force is applied to the button; and when the button and the cable wheel are engaged, the pulling force is applied to the leash cable, and the pulling force is adequate to counter the tangential biasing force of the flat coil spring, the pulling force causes the button to be biased together with the cable wheel toward a second rotational direction opposite the first rotational direction, and causes the cavity of the button to mis-align with the vertical post, preventing the vertical post to enter the cavity and preventing the button to be pressed down.

According to certain embodiments of the leash control device, a first end of the flat coil spring is fixed on the vertical post; and a second end of the flat coil spring is fixed on the outer cylindrical ring of the cable wheel.

According to certain embodiments of the leash control device, the button further includes two tab members configured on the upper portion of the button; and the top cover further includes two recesses configured to accommodate the two tab members of the button while limiting a rotation of the button about the central axis within an angular range relative to the top cover.

According to certain embodiments of the leash control device, the angular range is greater than 20 degrees and less than 40 degrees. According to certain embodiments of the leash control device, the angular range is approximately 30 degrees.

According to certain embodiments of the leash control device, a first end of the compression spring is fixed on the vertical post; and a second end of the compression spring is fixed on the button.

According to certain embodiments, the leash control device further includes a flat ring-shaped spacer configured fit inside the cable wheel, the flat ring-shaped spacer being configured under the hexagonal ring and above the flat coil spring.

According to certain embodiments of the leash control device, the leash control device further includes a clip configured to fix a first end of the leash to the cable wheel; and the housing includes a slot that allows a second end of the leash to extend out from the leash control device.

According to certain embodiments of the leash control device, the housing has a cylindrical shape with a diameter below or around 5 cm. According to certain embodiments of the leash control device, a height of the housing is below 2 cm.

In another aspect of the present disclosure, a retractable leash is provided. The retractable leash includes the leash control device in the forgoing description and the leash cable being wound around the cable wheel with a first end of the leash cable fixed on the cable wheel and a second end of the leash cable extended outside the housing of the leash control device.

According to certain embodiments, the retractable leash further includes a clasp connected to the second end of the leash cable and configured to attach the retractable leash to a pet collar.

BRIEF DESCRIPTION OF THE DRAWINGS

In order to more clearly illustrate the technical solutions in the embodiments of the present disclosure, the drawings used in the description of the embodiments will be briefly described below. It is obvious that the drawings in the following description are only some embodiments of the present disclosure. Other drawings may be obtained by those of ordinary skill in the art based on these drawings.

DETAILED DESCRIPTION

The technical solutions according to the embodiments of the present disclosure described in the following with reference to the accompanying drawings. The described embodiments are only part of the embodiments of the present disclosure, but not all the embodiments. All other embodiments obtained by a person of ordinary skill in the art based on the embodiments of the present disclosure without creative efforts are within the scope of the present disclosure.

The technical terms used in the present disclosure are for the purpose of describing particular embodiments, and are not intended to limit the present disclosure. Unless otherwise indicated in the context, the singular forms of "a", "said", and "the" are also meant to include plural forms. It should also be understood that the term "and/or" as used herein refers to and encompasses any and all possible combinations of one or more of the associated listed items. Further, terms describing positions, such as "top", "bottom", "up", "down", "upper", "lower", "left", "right", "front", "back", etc., may be used to describe relative positions between different components of the device and do not necessarily indicate an absolute direction or position.

Figure 1A:
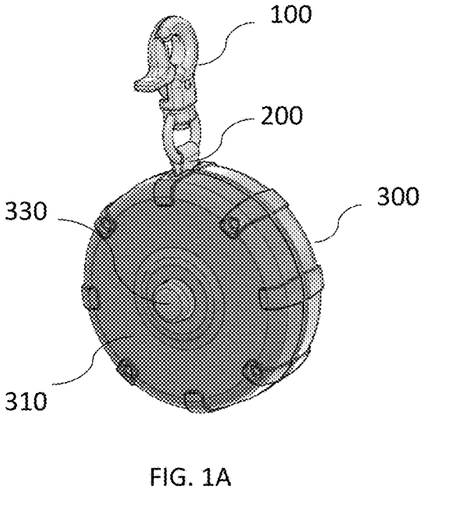
FIG. 1A illustrates an embodiment of a pet leash control device with a leash cable retracted inside the pet leash control device.

FIG. 1A illustrates a leash control device 300 according to certain embodiments. In the configuration shown in FIG. 1, a leash cable 200 is completely retracted into the leash control device 300. The leash control device 300 may have a button 330 extending from a surface of the leash control device 300. When the button 330 is not pressed, a first locking mechanism that prevents the leash cable to be extended is engaged by internal mechanical parts of the leash control device 300. A clasp 100 may be fixed on an external end of the leash cable 200. The clasp 100 may be used to attach the external end of the leash cable 200 to a collar of a pet animal, and thus attaching the leash control device 300 to the collar via the retracted and locked leash cable 200. In this configuration, the leash control device assembly may be worn by the pet animal as an accessory pendant, or to be used as a key chain.

The leash control device 300 may have a cylindrical overall shape. A size of the leash control device may be chosen so that a person may comfortably hold the leash control device 300 in his or her palm. In certain embodiments, the leash control device 300 may have a diameter below or around 5 cm and a thickness below 2 cm.

Figure 1B:
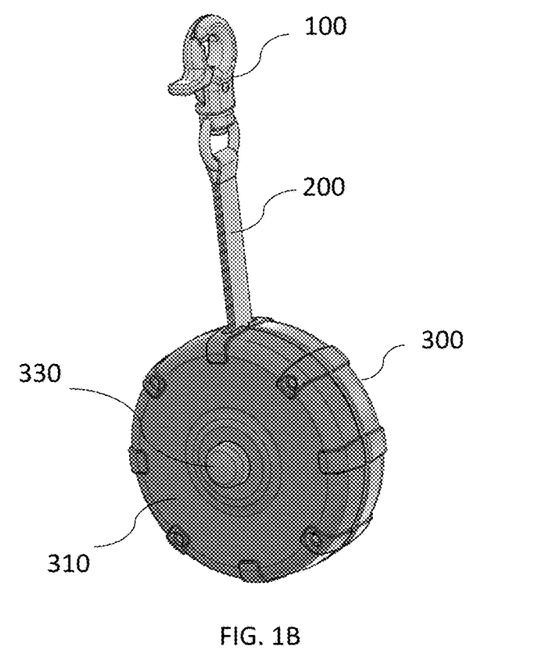
FIG. 1B illustrates the pet leash control device with a section of leash cable being extended out of the pet leash control device.

FIG. 1B illustrates a configuration where a length of the leash cable 200 is extended out of the leash control device. In certain embodiments, the button 330 is pressed down, the first locking mechanism may be disengaged. As a result, the leash cable 200 may be extended out of the leash control device 300 by a pulling force exerted on the leash cable 200 after button 330 is pressed down. Once a desirable length of the leash cable 200 is extended out of the leash control device 300, the button 330 may be released to engage the first locking mechanism again, locking the length of extended leash in place without further extending the leash cable 200 by the pulling force. On the other hand, when the button 330 is pressed down and no pulling force is applied to the leash cable 200, a section of the leash cable 200 that have extended out of the leash control device 300 will be retracted back into the leash control device 300.

According to certain embodiments, the leash control device 300 is equipped with a second locking mechanism. The second locking mechanism may be engaged when the button 330 is not pressed and a pulling force is exerted to the leash cable 200. The second locking mechanism, when engaged, prevents the button 330 to be pressed down, thus preventing extending the leash cable 200. The second locking mechanism is useful for preventing the first locking mechanism to be accidentally disengaged, e. g., caused by the button 330 being accidentally pressed, when the pet animal is pulling on the leash cable 200. That is, the button 330 can only be pressed down when there is no pulling force exerted on the leash cable 200. The implementations of the first and second locking mechanisms will be described below.

Figure 2:
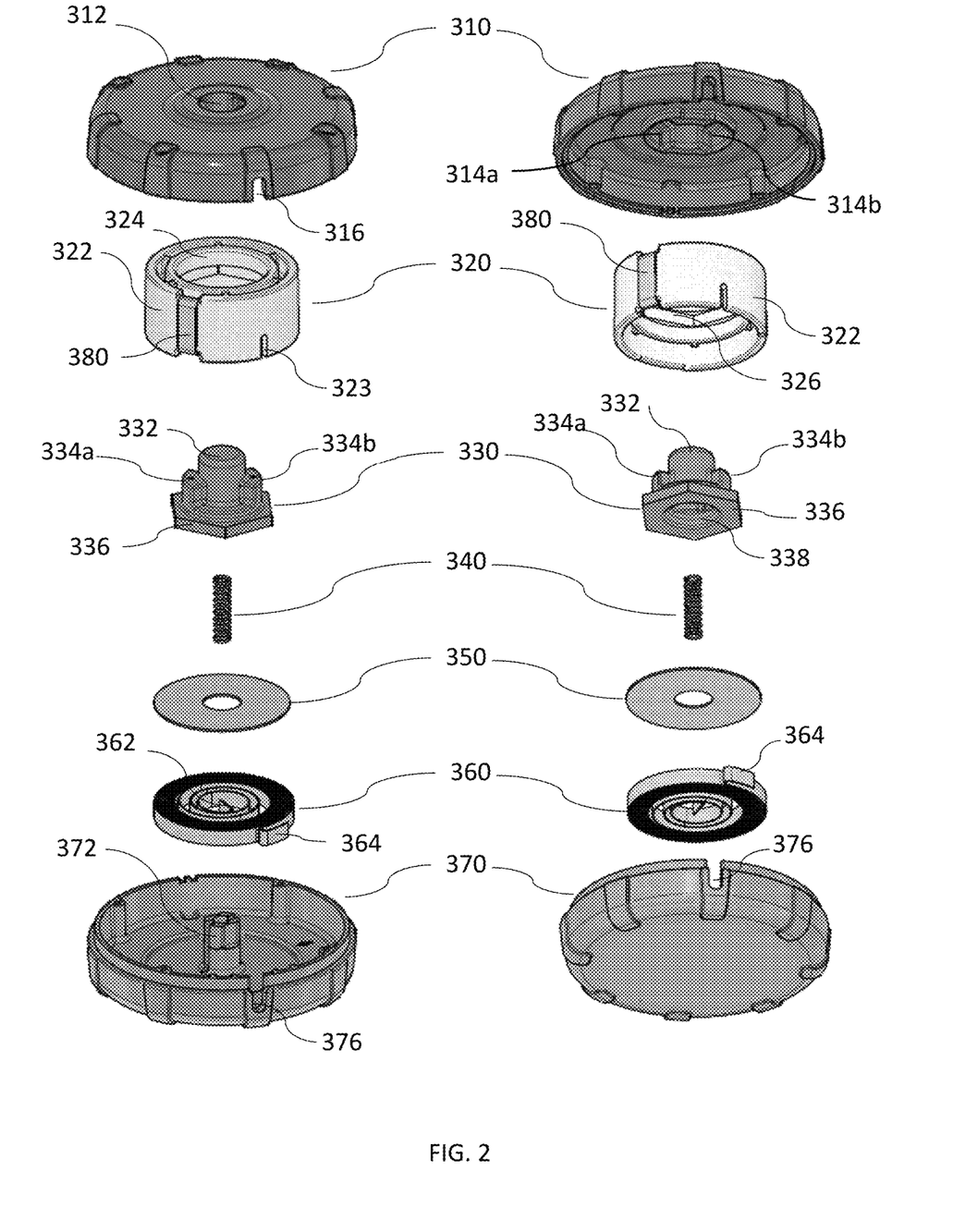
FIG. 2 illustrates various components of the pet leash control device in a first viewing angle, as shown in the left column, and in a second view angle, as shown in the right column.

FIG. 2 illustrates internal components of the leash control device 300. Specifically, the left column shows certain components in an exploded view, and the right column shows the same components in a second exploded view from a different viewing angle. As shown in FIG. 2, according to certain embodiments, the leash control device 300 may include a top cover 310, a cable wheel 320, a button 330, a compression spring 340, a spacer 350, a flat coil spring 360, a bottom cover 370, and a clip 380. The top cover 310 and the bottom cover 370 may be fixed together to form the cylindrical overall shape of the leash control device 300 and to enclose the internal components. The top cover 310 and the bottom cover 370 may be rigidly fixed to each other using screws, glue, being molded into a connected piece, or other suitable means. The leash cable 200 (not shown in FIG. 2) may wound around in an outer surface of the cable wheel 320. A first end of the leash cable 200 may be fixed to the cable wheel 320 by the clip 380 or by another suitable means. A second end of the leash cable 200 may extend though a slot formed by a first notch 316 in the top cover 310 and a second notch 376 in the bottom cover 370. The second end of the leash cable 200 may be extended outside the leash control device 300 to be attached to the clasp 100, as shown in FIG. 1A and FIG. 1B. The left column of FIG. 3 shows top views of the top cover 310, the leash cable wheel 320, the button 330, the flat coil spring 360, and the bottom cover 370, and the right column of FIG. 3 show bottom views of those components.

Figure 3:
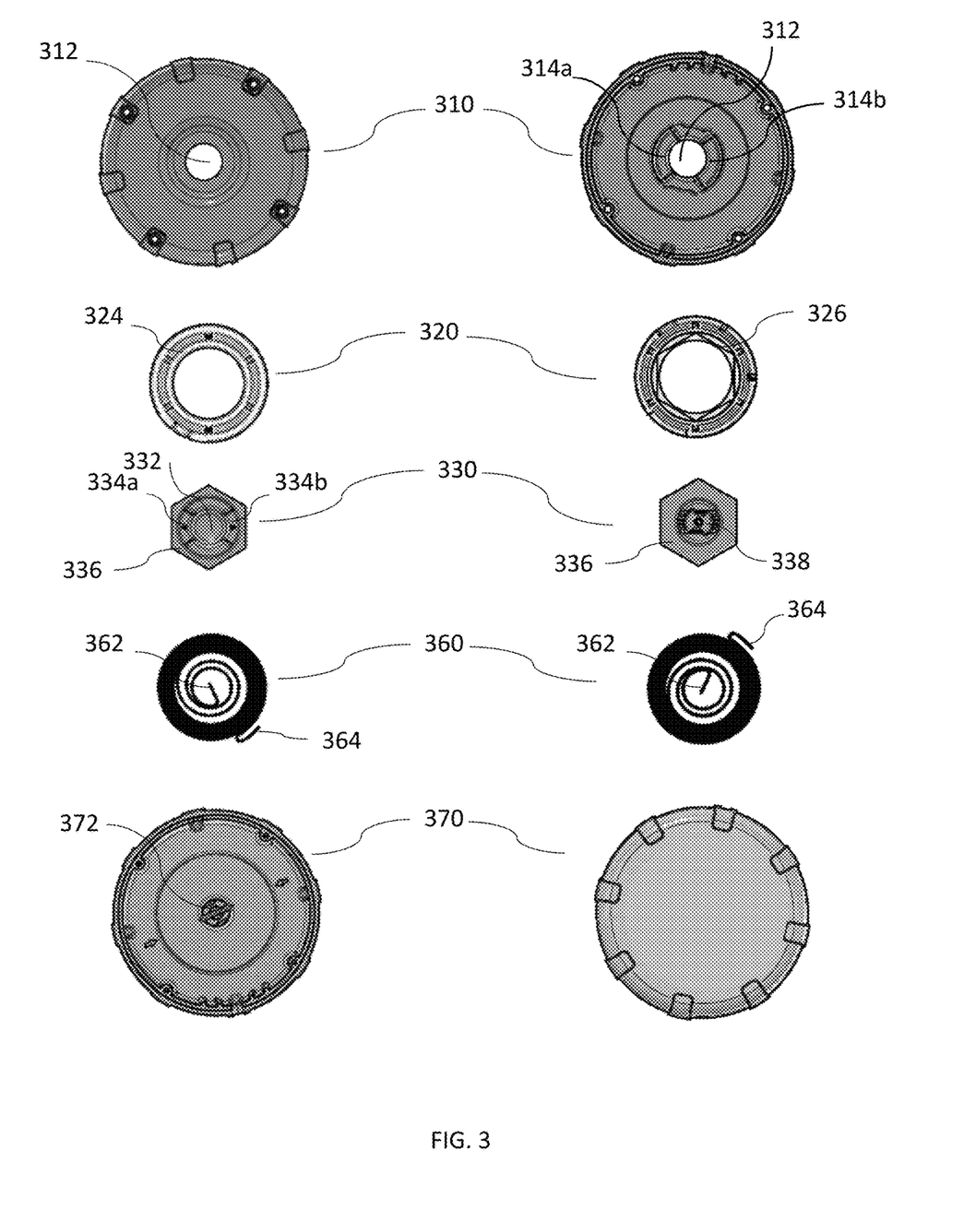
FIG. 3 illustrates various components of the pet leash control device in a top view, as shown in the left column, and in a bottom view, as shown in the right column.

As shown in FIG. 2 and FIG. 3, the top cover 310 may have a though hole 312 through a center of a circular top piece. An underside of the top cover 310 may have a pair of tab-shaped recesses 314a and 314b, one on each side. The button 330 may have a cylindrical member 332 configured on a top side of the button 330. When ensembled, the cylindrical member 332 may extend out of the through hole 312 of the top cover 310. The button 330 may further include a pair of tab members 334a and 334b configured on the top side of the button 330. When ensembled, the tab members 334a and 334b may be held in the tab-shaped recesses 314a and 314b of the top cover 310. Each of the tab-shaped recesses 314a or 314b may have a bigger cross section compared to the tab members 334a and 334b, thus leaving room for the button 330 to rotate about a central axis relative to the top cover 310 within an angular range. In certain embodiments, the angular range is smaller than 90 degrees. In certain embodiments, the angular range is between 20 degree to 40 degree. In certain embodiments, the angular range is around 30 degrees. The button 330 may further include a hexagonal base 336 having a shape of a hexagonal cylinder, and a cavity 338 in the hexagonal base 336. The cavity 338 may have an opening in a bottom surface of the hexagonal base 336.

The cable wheel 320 may have a nested-ring structure. For example, the cable wheel 320 may include a cylindrical outer ring 322, a cylindrical inner ring 324 nested inside a top portion of the cylindrical outer ring 322, and a hexagonal ring 326 nested inside the cylindrical outer ring 322 below the cylindrical inner ring 324. The hexagonal ring 326 may have a hexagon-shaped hole at its center. The hexagon-shaped hole may match the cross section of the hexagonal base 336 of the button 330. When assembled, the cylindrical member 332 of the button 330 may extend through the cylindrical inner ring 324 of the cable wheel 320. The compression spring 340 may be vertically fit into the cavity 338 of the button 330 with one end attached to an internal top surface of the cavity 338 and another end attached to the vertical post 372 of the bottom cover 370.

When the button 330 is not pressed down, the button 330 may be biased upward by the compression spring 340, so the hexagonal base 336 of the button 330 is held within the hexagon-shaped hole of the hexagonal ring 326. As a result, in this configuration, the cable wheel 320 is engaged with the button 330 via mating between the hexagonal base 336 and the hexagonal ring 326, thus preventing the cable wheel 320 to rotate freely and preventing the leash cable 200 to be unwound or extended. On the other hand, when the button 330 is pressed down, the hexagonal base 336 of the button 330 is not held within the hexagon-shaped hole of the hexagonal ring 326. As a result, in the configuration where the button is pressed down, the cable wheel 320 is disengaged from the button 330, allowing the cable wheel 320 to rotate freely when a pulling force is applied to the cable 200, and thus allowing the cable 200 to be unwound and extended from the leash control device. Thus, the first locking/unlocking mechanism may be implemented by mating/disengaging between the button 330 and the cable wheel 320. It is noted that the hexagonal base 336 and the hexagonal ring 326 are one example of a many shapes that can be used to implement the engagement of the button 330 and the cable wheel 320. Another non-circular cylindrical base may replace the hexagonal base 336 of the button 330, as long as the shape of a non-circular cross section of the base match an non-circular inner hole of a ring that replaces the hexagonal ring 326 of the cable wheel 320.

The vertical post 372 of the bottom cover 370 may extrude vertically on a top surface of the bottom cover 370. In certain embodiment, a cross section of the vertical post 372 is a non-circular shape. The cavity 338 of the button 330 also has a non-circular shaped cross section that accommodates the vertical post 372 when the button 330 and the vertical post 372 are aligned in certain relative rotational positions between the button 330 and bottom cover 370. In certain other relative positional positions between the button 330 and the bottom cover 370, the cavity 338 does not accommodate the vertical post 372, i.e., the button 330 and the bottom cover 370 are mis-aligned. That is, when the relative rotational positions of the button 330 and the bottom cover 370 are at certain angles, the vertical post 372 may extend into the cavity 338 of the button 330, allowing the button 330 to be pressed down. And when the relative rotational positions of the button 330 and the bottom cover 370 are at certain other angles, a miss-alignment prevents the vertical post 372 to extend into the cavity 338 of the button 330, preventing the button 330 to be pressed down.

Figure 4A:
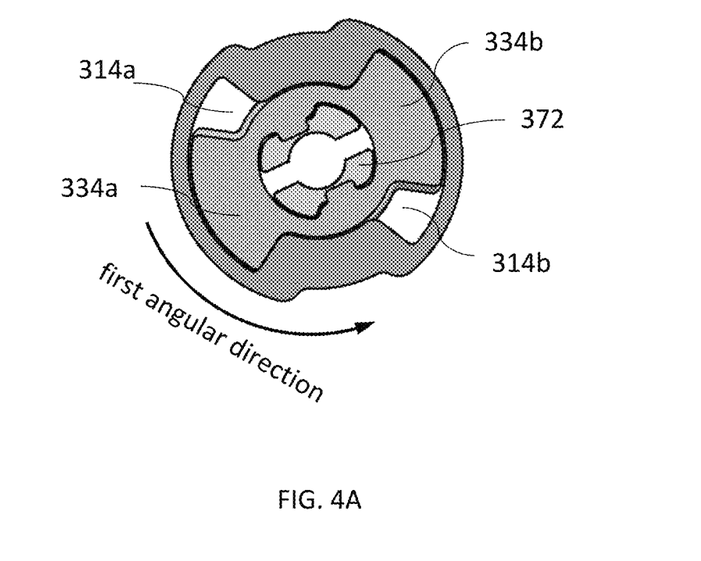
FIG. 4A illustrates relative positions of tab-shaped recesses, tab members, and a vertical post of the pet leash control device in one configuration.

The spacer 350 may have a flat ring shape. The spacer 350 may fit inside the cable wheel 320 under the hexagonal ring 326. The flat coil spring 360 may fit inside the cable wheel 320 under the spacer 350. The flat coil spring 360 has a first end 362 at the center of the flat coil spring 360 and a second end 364 at the periphery of the flat coil spring 360. The first end of the 362 of the flat coil spring 360 may be fixed on the vertical post 372 of the bottom cover 370. The cable wheel 320 may further include a third notch 323 in the cylindrical outer ring 322. The second end 364 of the flat coil spring 360 may be fixed to the cable wheel 320 via the third notch 323. As a result, when there is no rotational force exerted on the cable wheel 320 through pulling on the leash cable 200, the cable wheel 320 may be biased by the flat coil spring 360 in a first angular direction, for example, in a clockwise rotation direction or in a counter clockwise direction. When the button 330 is not pressed down, since the button 330 and the cable wheel 320 is now engaged through mating of the hexagonal base 336 and the hexagonal ring 326, the button 330 is also biased by the flat coil spring 360 in the first angular direction until the tab members 334a and 334b of the button 330 are limited in the first angular direction by the tab-shaped recesses 314a and 314b of the top cover 310. In this configuration, the relative rotational positions between the button 330 and the bottom cover 370 are such that the cavity 338 of the button 330 can accommodate the vertical post 372 of bottom cover 370 when the button 330 is pressed down. FIG. 4A illustrates relative positions of the tab-shaped recesses 314a and 314b, the tab members 334a and 334b, and the vertical post 372 when the button 330 is biased by the flat coil spring 360 in the first angular direction relative to the top cover 310 and the bottom cover 370. As shown in FIG. 4A, in this configuration, the cavity 338 of the button 330 can accommodate the vertical post 372 of bottom cover 370.

Figure 4B:
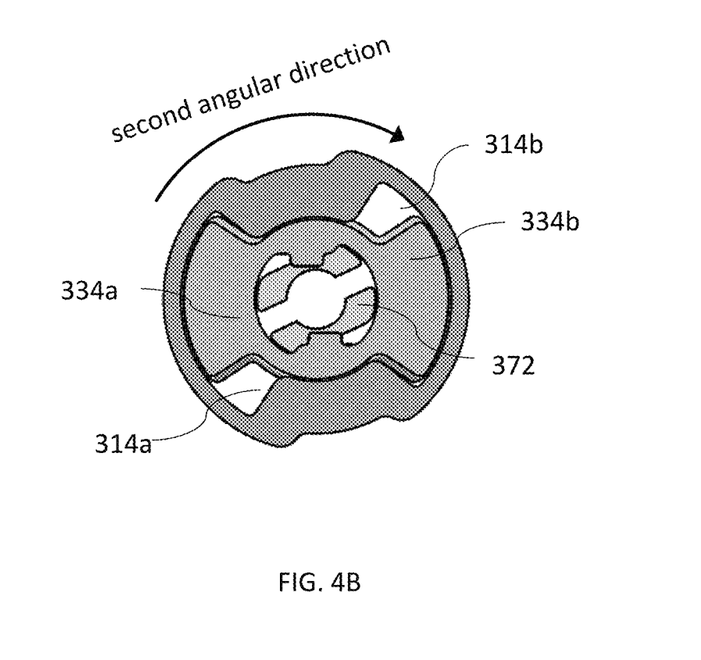
FIG. 4B illustrates relative positions of tab-shaped recesses, tab members, and a vertical post of the pet leash control device in another configuration.

On the other hand, when the button 330 is not pressed down and a pulling force is applied to the cable wheel 320 through the cable 200 that exceeds a biasing force exerted by the flat coil spring 360 and in a second angular direction opposite to the first angular direction, since the button 330 is now engaged with the cable wheel 320, the button 330 is biased by the pulling force in the second angular direction until the tab members 334a and 334b of the button 330 are limited in the second angular direction by the tab-shaped recesses 314a and 314b of the top cover 310. In this configuration, relative rotational positions between the button 330 and the bottom cover 370 are such that the cavity 338 of the button 330 cannot accommodate the vertical post 372 of bottom cover 370, and thus preventing the button 330 to be pressed down. FIG. 4B illustrates relative positions of the tab-shaped recesses 314a and 314b, the tab members 334a and 334b, and the vertical post 372 when the button 330 is biased by the pulling force in the second angular direction relative to the top cover 310 and the bottom cover 370. As shown in FIG. 4B, in this configuration, the cavity 338 of the button 330 cannot accommodate the vertical post 372 of bottom cover 370, thus preventing the button 330 to be pressed down. Thus, the second locking mechanism may prevent the button to be pressed down when a pulling force is applied to the leash cable. It should be noted that the second locking mechanism is engaged only when the button 320 is not already pressed down AND the pulling force is applied to the leash cable 200. If the button 320 is pressed down when no puling force is applied to the leash cable 200, the button 330 is disengaged from the cable wheel 320 and thus the button 330 does not rotate with the cable wheel 320. In this case, a pulling force applied to leash cable 200 will cause the cable wheel 320 to rotate and the cable 200 to unwind to extend out of the leash control device. If the button 330 is pressed down and there is no pulling force applied to the leash cable 200, the biasing force from the flat coil spring 360 may cause the cable wheel 320 to rotate in the first angular direction to wind and retract a section of the leash cable 200 that has been previously pulled out.

In summary, the present disclosure provides a leash control device 300 equipped with a first locking mechanism and a second locking mechanism. When a button 330 of the leash control device 300 is not pressed down, the first locking mechanism is engaged. In this configuration, the leash control device 300 device prevents the leash cable 200 to be further extended out of the leash control device 300. The leash control device 300 also prevents a section of the leash cable 200 that have been pulled out to retract back into the leash control device. When there is no pulling force applied to the leash cable 200, the button 330 allows being pressed down. And once the button 330 is pressed down, the first locking mechanism is disengaged and the leash cable 200 can be unwound and extended out of the leash control device 300 when a pulling force is applied to the leash cable 200. When there is no pulling force applied to the leash cable 200, a section of the leash cable 200 that has been previously extended out of the leash control device 300 may be retracted back into the leash control device 300. However, when the button 330 is not already pressed down and a puling force is applied to the leash cable 200, a second locking mechanism is engaged to prevent the button 330 to be pressed down. The second locking mechanism prevents the button 330 to be pressed down by accident when the leash cable is being pulled, thus providing additional safety features to the device. When the pulling force applied on the leash cable 200 is withdrawn, the second locking mechanism is disengaged, and the button 330 may be pressed down when needed to disengage the first locking mechanism.

The leash control device provided by the present disclosure is also compact and may be comfortably fit in a user's palm or be used as a key chain attachment. Various components of the leash control device 300, such as the top cover 310, the cable wheel 320, the button 330, and the bottom cover 370 may be made of suitable polymers, making the device light-weight, and can be comfortably worn as an accessory pendant on a pet collar by a pet animal.

The method and apparatus provided by the present disclosure according to the embodiments are described in detail above. The principles and implementation manners provided by the present disclosure are described herein by using specific examples. The description of the above embodiments is only used to help understand the method provided by the present disclosure. At the same time, a person skilled in the art will make changes the specific embodiments and the application scope according to the idea provided by the present disclosure. In summary, the contents of the present specification should not be construed as limiting the present disclosure.

The present disclosure contains material that is subject to copyright protection. The copyright is the property of the copyright holder. The copyright holder has no objection to the reproduction of patent documents or patent disclosure in the official records and files of the Patent and Trademark Office.

What is claimed is:
1. A leash control device, comprising:
  a housing including a top cover and a bottom cover rigidly connected to the top cover; a cable wheel including a cylindrical outer ring, the cylindrical outer ring being configured for a leash cable to be wounded on an outer surface of the cylindrical outer ring;
  a button having a cylindrical member configured on an upper portion of the button and a base configured on a lower portion of the button, the cylindrical member being configured to be extended through a central hole of the top cover; and a compression spring configured to bias the button in an upward direction to cause the button to engage with the cable wheel;

wherein:

when a pressing force is applied to the cylindrical member of the button to counter an upward biasing force of the compression spring and no pulling force is applied to the leash cable, the button is configured to be pressed down and disengaged from the cable wheel, and after the button is disengaged from the cable wheel, the cable wheel is configured to rotate freely about a central axis when a pulling force is applied to the leash cable, causing the leash cable to unwind and extend out of the leash control device; and when the button is not pressed down and a pulling force is applied to the leash cable, a vertical post configured on an upper surface of the bottom cover interferes with an underside surface of the base of the button, preventing the button to be pressed down.

2. The leash control device according to claim 1, wherein:
the base of the button has a non-circular cylindrical shape;
the cable wheel further includes a second ring nested in the cylindrical outer ring, the second ring having a central hole having a non-circular shape that matches the base of the button; when the button is not pressed down, the base of the button fits into the central hole of the second ring of the cable wheel, engaging the cable wheel with the button, preventing the cable wheel to rotate freely, and preventing the leash cable to unwind when the pulling force is applied to the leash cable; and
when the button is pressed down, the base of the button is not held within the central hole of the second ring of the cable wheel, allowing the cable wheel to rotate and the leash cable to unwind when the pulling force is applied to the leash cable.

3. The leash control device according to claim 2, wherein the base of the button has a hexagonal cylindrical shape and the central hole of the second ring has a hexagon shape that matches the base of the button.

4. The leash control device according to claim 2, wherein:
the button further includes a cavity configured on an underside of the base;
the vertical post configured on the bottom cover has a non-circular shaped cross-section;
the leash control device further includes a flat coil spring configured to bias the cable wheel with a tangential biasing force toward a first rotational direction relative to the top cover and the bottom cover when there is no pulling force applied to the leash cable;
when the button and the cable wheel is engaged and there is no pulling force applied to the leash cable, the button is biased together with the cable wheel toward the first rotational direction and cause the cavity of the button to be aligned with the vertical post, allowing the vertical post to enter the cavity and allowing the button to be pressed down when the pressing force is applied to the button; and
when the button and the cable wheel are engaged, the pulling force is applied to the leash cable, and the pulling force is adequate to counter the tangential biasing force of the flat coil spring, the pulling force causes the button to be biased together with the cable wheel toward a second rotational direction opposite the first rotational direction, and causes the cavity of the button to mis-align with the vertical post, preventing the vertical post to enter the cavity and preventing the button to be pressed down.

5. The leash control device according to claim 4, wherein:
a first end of the flat coil spring is fixed on the vertical post; and
a second end of the flat coil spring is fixed on the outer cylindrical ring of the cable wheel.

6. The leash control device according to claim 4, wherein:
the button further includes two tab members configured on the upper portion of the button; and
the top cover further includes two recesses configured to accommodate the two tab members of the button while limiting a rotation of the button about the central axis within an angular range relative to the top cover.

7. The leash control device according to claim 6, wherein:
the angular range is greater than 20 degrees and less than 40 degrees.

8. The leash control device according to claim 7, wherein:
the angular range is approximately 30 degrees.

9. The leash control device according to claim 4, further comprising:
a flat ring-shaped spacer configured fit inside the cable wheel, the flat ring-shaped spacer being configured under a hexagonal ring and above the flat coil spring.

10. The leash control device according to claim 1, wherein:
a first end of the compression spring is fixed on the vertical post; and
a second end of the compression spring is fixed on the button.

11. The leash control device according to claim 1, wherein:
the leash control device further includes a clip configured to fix a first end of the leash to the cable wheel; and
the housing includes a slot that allows a second end of the leash to extend out from the leash control device.

12. The leash control device according to claim 11, wherein: a height of the housing is below 2 cm.

13. The leash control device according to claim 11, wherein:
the leash cable being wound around the cable wheel with a first end of the leash cable fixed on the cable wheel and a second end of the leash cable extended outside the housing of the leash control device.

14. The retractable leash according to claim 13, further comprising:
a clasp connected to the second end of the leash cable and configured to attach the retractable leash to a pet collar.

15. The leash control device according to claim 1, wherein: the housing has a cylindrical shape with a diameter below or around 5 cm.

16. A leash control device, comprising:
a housing including a top cover and a bottom cover rigidly connected to the top cover; a cable wheel including a cylindrical outer ring, the cylindrical outer ring being configured for a leash cable having a first end and a second end to be wounded on an outer surface of the cylindrical outer ring;
a button having a cylindrical member configured on an upper portion of the button and a base configured on a lower portion of the button, the cylindrical member being configured to be extended through a central hole of the top cover;

a compression spring configured to bias the button in an upward direction to cause the button to engage with the cable wheel; and a clasp connected to the second end of the leash cable and configured to attach the retractable leash to a pet collar, wherein:

when a pressing force is applied to the cylindrical member of the button to counter an upward biasing force of the compression spring and no pulling force is applied to the leash cable, the button is configured to be pressed down and disengaged from the cable wheel, and after the button is disengaged from the cable wheel, the cable wheel is configured to rotate freely about a central axis when a pulling force is applied to the leash cable, causing the leash cable to unwind and extend out of the leash control device; and when the button is not pressed down and a pulling force is applied to the leash cable, a vertical post configured on an upper surface of the bottom cover interferes with an underside surface of the base of the button, preventing the button to be pressed down, the leash cable being wound around the cable wheel with the first end of the leash cable fixed on the cable wheel and the second end of the leash cable extended outside the housing of the leash control device.

* * * * *